Dec. 26, 1939.  W. C. REYNOLDS ET AL  2,185,093
RUBBER BASKET
Filed June 6, 1939
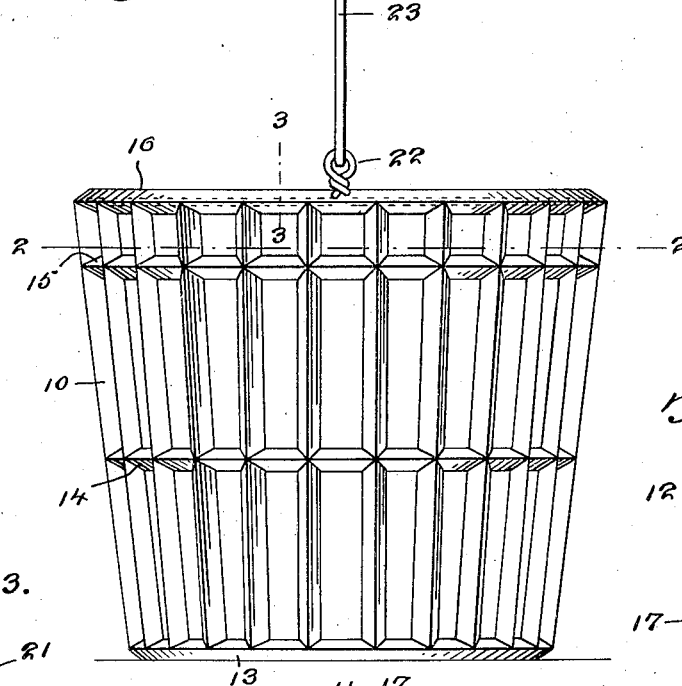
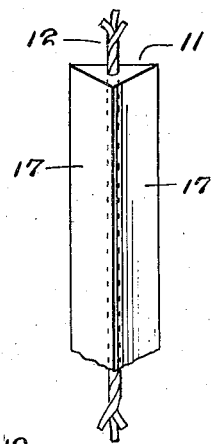
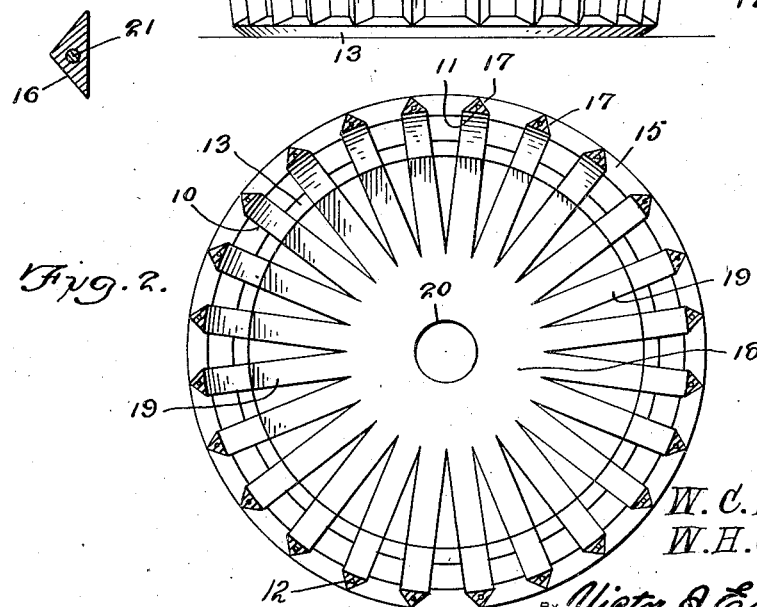
W. C. Reynolds
W. H. Jordan
INVENTOR
BY Victor J. Evans & Co.
ATTORNEYS Patented Dec. 26, 1939

2,185,093

UNITED STATES PATENT OFFICE 2,185,093

RUBBER BASKET

Walter C. Reynolds, Gering, Nebr., and William H. Jordan, Denver, Colo.

Application June 6, 1939, Serial No. 277,694

2 Claims. (Cl. 150—48)

This invention relates to rubber baskets and has for an object to provide a basket of this type in which the staves will be resilient so that the basket returns to normal position when crushed or accidentally distorted during rough conditions of service.

A further object is to provide a basket of this type in which the staves are substantially triangular in cross section and have their bases presented inwardly toward the axis of the basket to provide flat yielding surfaces which will not crush fruits or vegetables or mar the skins of thin skins of fruits or vegetables stored therein.

A further object is to provide a basket of this type which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a side elevation of a rubber basket constructed in accordance with the invention.

Figure 2 is a cross sectional view taken on the line 2—2 of Figure 1.

Figure 3 is a cross sectional view of the rim of the basket taken on the line 3—3 of Figure 1.

Figure 4 is a perspective view of one of the staves of the basket showing the reinforcing fibrous core thereof.

Referring now to the drawing in which like characters of reference designate similar parts in the various views, the rubber basket comprising the subject matter of this invention includes a plurality of rubber staves 10 of triangular formation in cross section and arranged with their bases 11 facing inwardly toward the axis of the basket. The rubber material of which the staves are formed is of sufficient consistency to be resilient while at the same time is sufficiently yielding to prevent the bruising or marring of fruits, or vegetables. Each stave is reinforced by a core 12 of twisted fabric, best shown in Figure 4, extending centrally through the stave.

The staves are held in proper spaced relation by a bottom ring 13, two intermediate rings 14 and 15, and a rim ring 16. All of the rings are similar in cross section to the staves and are vulcanized to the sides 17 of the staves, as best shown in Figure 3.

A rubber disc bottom 18 is provided with radially disposed spokes 19, of substantially rectangular cross section, which are secured to the flat base of the bottom ring 13, as also best shown in Figure 3. The bottom disc is provided with a central opening 20.

All of the rings, staves and spokes of the bottom are vulcanized at their points of contact to provide a basket of a single unitary piece. Due to the resiliency of the parts, the gasket will return to normal position when it is deformed by shocks and jars and by virtue of the inextensibility of the twisted fabric cores of the staves the basket will be reinforced against bulging when fruit or vegetables are stored therein.

The rim ring 16 of the basket is reinforced through the medium of a wire ring 21 disposed centrally in the rubber ring and to which are attached wire metal eyes 22. A bail 23 is attached to the eyes. The metal ring 21 prevents breaking of the rim of the basket when carried from place to place fully loaded.

From the above description it is thought that the construction and operation of the invention will be fully understood without further explanation.

What is claimed is:

1. A rubber basket comprising rubber staves of triangular cross section arranged with their bases facing inwardly toward the axis of the basket, rubber rings of similar cross section to the staves having their bases turned inwardly and connected to the staves to hold the staves in properly spaced relation, means reinforcing the staves axially against bulging, a metal wire disposed in the uppermost rubber ring to reinforce the uppermost rubber ring, and a bail secured to said wire ring.

2. A rubber basket comprising rubber staves of triangular formation in cross section arranged with their bases facing inwardly, twisted fabric strands disposed axially in the staves to reinforce the staves against bulging, rubber spacing rings disposed transversely of the staves and connecting the staves together in proper spaced relation, said rings being of substantially triangular cross section with their bases facing inwardly toward the axis of the basket, a metal ring forming a reinforcing core for the uppermost rubber ring, eyes carried by said metal ring, and a bail connected to said eyes.

WALTER C. REYNOLDS.
WILLIAM H. JORDAN.